US011423458B2

(12) United States Patent
Sharma et al.

(10) Patent No.: US 11,423,458 B2
(45) Date of Patent: Aug. 23, 2022

(54) COMPUTER APPLICATION OF INTERNET OF THINGS (IOT) DEVICES TO SELECT PERISHABLE ITEMS BY TIME TO EXPIRATION

(71) Applicant: INTERNATIONAL BUSINESS MACHINES CORPORATION, Armonk, NY (US)

(72) Inventors: Radhika Sharma, Bangalore (IN); Mukundan Sundararajan, Bangalore (IN); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 54 days.

(21) Appl. No.: 16/569,150

(22) Filed: Sep. 12, 2019

(65) Prior Publication Data

US 2021/0082021 A1    Mar. 18, 2021

(51) Int. Cl.
*G06Q 30/06* (2012.01)

(52) U.S. Cl.
CPC ..... *G06Q 30/0627* (2013.01); *G06Q 30/0641* (2013.01)

(58) Field of Classification Search
None
See application file for complete search history.

(56) References Cited

U.S. PATENT DOCUMENTS 10,290,047 B1 *  5/2019  Goyal ................ G06Q 30/0643
10,555,505 B2 *  2/2020  Hummer ................ A01K 51/00
(Continued)

FOREIGN PATENT DOCUMENTS

CN     107318494 A     11/2017
CN     107330807 A     11/2017
(Continued)

OTHER PUBLICATIONS

Baietto, Manuela, and Alphus D Wilson. "Electronic-nose applications for fruit identification, ripeness and quality grading." Sensors (Basel, Switzerland) vol. 15,1 899-931. Jan. 6, 2015, doi:10.3390/s150100899 (Year: 2015).*

(Continued)

*Primary Examiner* — Michelle T Kringen
(74) *Attorney, Agent, or Firm* — Tutunjian & Bitetto, P.C.; Michael A. Petrocelli

(57) ABSTRACT

A computer implemented method for analysis and tracking perishable items for selection of perishable items using IOT devices that includes registering a consumer to a system that assists the selection of perishable items using IOT devices based upon consumer preferences, in which the system collects data from the user, wherein the user can revoke permission to the system at any time; and monitoring harvesting of a plurality of perishable item types using a plurality of internet of things (IOT) devices. The method may further include recording a consumer profile on the system that assists in the selection of perishable items from the consumer including consumer preferences for freshness of perishable items. The method may further include matching perishable items having freshness data from monitoring the harvest to the consumer based upon consumer preferences from the consumer profile.

18 Claims, 6 Drawing Sheets

(56) References Cited

U.S. PATENT DOCUMENTS

| | | | |
|---|---|---|---|
| 10,825,567 B1* | 11/2020 | Wala | G16H 50/20 |
| 2017/0286772 A1* | 10/2017 | Workman | H04L 67/10 |
| 2017/0300856 A1* | 10/2017 | Wilkinson | G06K 19/0717 |
| 2018/0005295 A1* | 1/2018 | Howell | G06Q 30/0631 |
| 2018/0042178 A1 | 2/2018 | Nakano et al. | |
| 2018/0083771 A1* | 3/2018 | Bonnell | H04L 9/3247 |
| 2018/0093814 A1* | 4/2018 | Espinosa | A23L 3/01 |
| 2018/0195929 A1* | 7/2018 | Cook | G01N 3/20 |
| 2018/0249051 A1* | 8/2018 | Send | G01C 3/02 |
| 2020/0333782 A1* | 10/2020 | Kent | G05D 1/0022 |
| 2020/0334628 A1* | 10/2020 | Goldberg | B25J 11/0045 |

FOREIGN PATENT DOCUMENTS

| | | | | |
|---|---|---|---|---|
| CN | 109242258 A | | 1/2019 | |
| KR | 20150136159 A1 | * | 12/2015 | G06Q 30/06 |
| KR | 101595538 B1 | * | 2/2016 | |

OTHER PUBLICATIONS

Mell, P. et al., "The NIST Definition of Cloud Computing," 2011, 7 pages.

Wise, P.M. et al., "Quantification of Odor Quality" Chemical Senses (Aug. 2000) pp. 429-443, vol. 25, No. 4.

Stein, M. et al., "Image Based Mango Fruit Detection, Localisation and Yield Estimation Using Multiple View Geometry" Sensors (Nov. 2016) pp. 1-25, vol. 16, No. 1915.

Balakrishnan, A., "Amazon has a low-key start-up, Amazon Live, focused on ways to make purchases through interactive videos" (Sep. 2017) pp. 1-9, https://www.cnbc.com/2017/09/21/amazon-live-video-shopping-start-up-hiring-in-new-york.html.

Shepherd, A.W. "Economic and marketing aspects of post-harvest handling of grains" Marketing and Rural Finance Service Agricultural Services Division (Nov. 1993) http://www.fao.org/3/x5015e/x5015E01.htm, accessed on Jun. 12, 2019, pp. 1-9.

* cited by examiner

COMPUTER APPLICATION OF INTERNET OF THINGS (IOT) DEVICES TO SELECT PERISHABLE ITEMS BY TIME TO EXPIRATION

BACKGROUND

The present invention generally relates to computer analysis of tracking and assessing perishable items, and more particularly to methods and systems for selecting perishable items based upon their time to expiration.

Consumers generally buy perishable items furthest from their expiration dates, so long as the perishable items are suitable for their intended purpose at the purchase date. However, it is not always possible for vendors to keep items fresh, or consumer scheduling does not present the consumers with the opportunity to buy perishable items during the right stage of development. In some scenarios, food preparers want to retain flavor from vegetables and fruits by selecting them from a single plant at a given stage of maturity.

SUMMARY

In accordance with an embodiment of the present invention, a method is provided for controlling the selection of perishable items using IOT devices.

In one embodiment, the computer implemented method for selection of perishable items using IOT devices may include registering a consumer to a system that assists the selection of perishable items using IOT devices based upon consumer preferences. The system collects data from the user, and the user can revoke permission to the system at any time. The computer implemented method further includes monitoring the harvesting of a plurality of perishable items using a plurality of internet of things (IOT) devices. The method can further include recording freshness data from the perishable items to the system during harvesting. In some embodiments, a consumer profile is recorded including consumer preferences for freshness of a perishable item. The consumer can select a perishable item type through an online shopping portal that is linked to the system that assists the selection of perishable items using IOT devices based upon consumer preferences. The method may continue with matching perishable items within the perishable item type having freshness data from monitoring the harvest to the consumer based upon consumer preferences from the consumer profile to provide matched perishable items. A display of the matched perishable items is transmitted to the consumer through the online shopping portal from the system that assists the selection of perishable items using IOT devices. The display depicts freshness data to the consumer for the perishable items.

In another aspect, the present disclosure describes a system for controlling the selection of perishable items using internet of things (IOT) devices. In some embodiments, the system includes a registry for consumers, in which the system for controlling the selection of perishable items collects data from the consumers for recording a consumer profile. The consumer profile includes consumer preferences for freshness of perishable items. The consumers can revoke permission to the system at any time. In some embodiments, the system includes an interface with an online shopping portal through which the consumer selects perishable item types. The system can further include at least one interface for receiving harvest data on perishable items from the internet of things (IOT) devices. The system for controlling the selection of perishable items using IOT devices further includes at least one hardware processor for comparing the harvest data measured with the IOT devices on the perishable items to the consumer preferences for freshness from the consumer profile to provide matched perishable items. In some embodiments, the system for controlling the selection of perishable items using IOT devices also includes a transmitter for transmitting a display of the matched perishable items to the consumer through the online shopping portal, in which the display depicts freshness data to the consumer for the perishable items.

In yet another aspect of the present disclosure, a computer program product is provided. In one embodiment, a computer readable storage medium is provided that includes a computer readable program for the selection of perishable items using IOT devices, wherein the computer readable program when executed on a computer causes the computer to perform the steps of registering a consumer to a system that assists the selection of perishable items using IOT devices based upon consumer preferences, in which the system collects data from the user. The user can revoke permission to the system at any time. The method performed by the steps stored on the computer readable storage medium monitor harvesting of a plurality of perishable item types using a plurality of internet of things (IOT) devices. The method performed by the steps stored on the computer readable storage medium also provides for recording to the system that assists in the selection of perishable items freshness data from the perishable items within the perishable item types being monitored during said harvesting; and recording a consumer profile on the system that assists in the selection of perishable items from the consumer including consumer preferences for freshness of perishable items. The method may further include selecting a perishable item type by the consumer through an online shopping portal that is linked to the system that assists the selection of perishable items, and matching perishable items within the perishable item type having freshness data from monitoring the harvest to the consumer based upon consumer preferences from the consumer profile to provide matched perishable items. In some embodiments, the instructions stored on the computer readable storage medium includes the step of transmitting a display of the matched perishable items to the consumer through the online shopping portal, in which the display depicts freshness data to the consumer for the perishable items.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
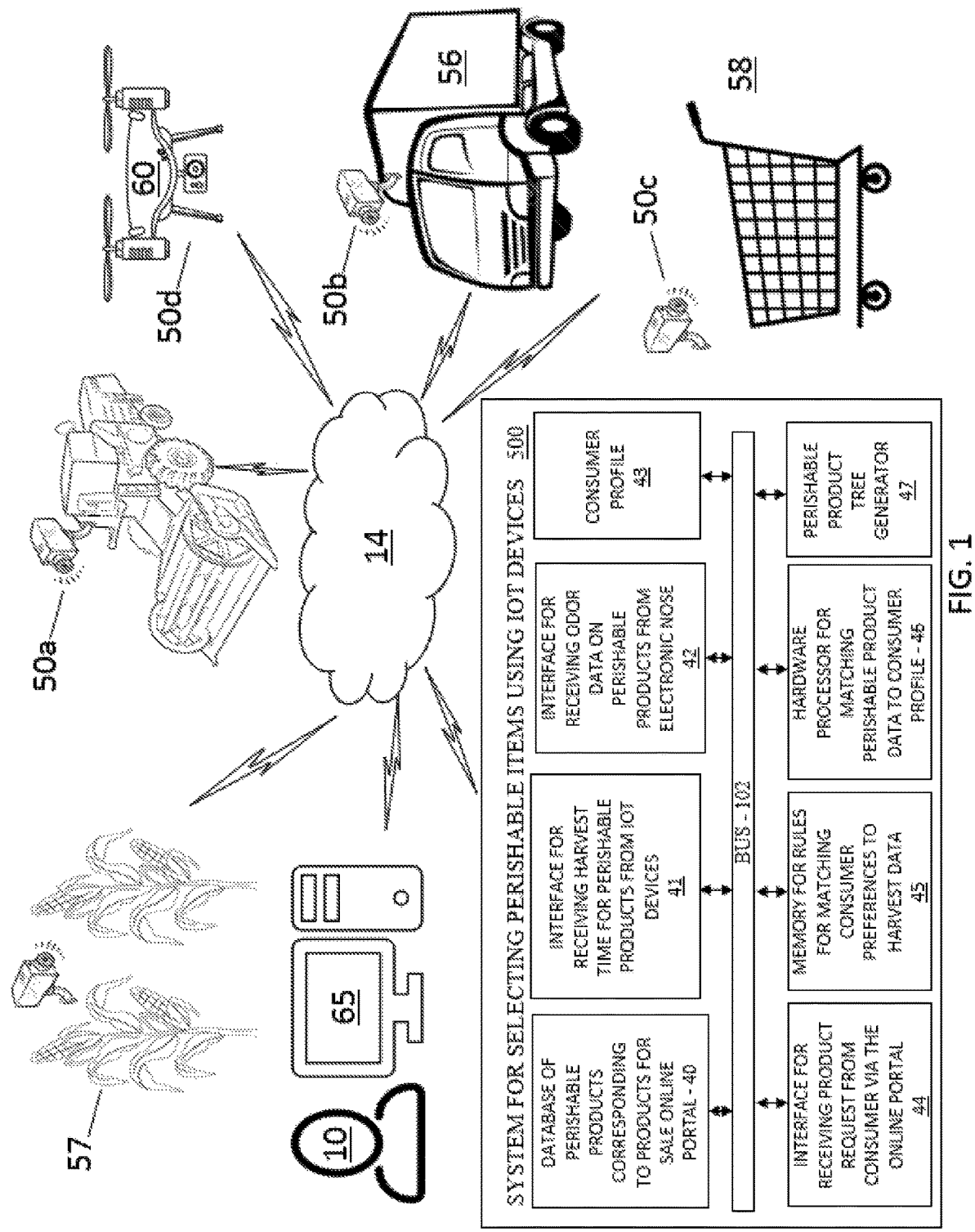
FIG. 1 is a diagram illustrating an example environment for methods, systems and computer program products for analysis and tracking of perishable items for the selection of perishable items using internet of things (IOT) devices, in accordance with one embodiment of the present disclosure.

Detailed embodiments of the claimed methods, systems and computer program products are disclosed herein; however, it is to be understood that the disclosed embodiments are merely illustrative of the methods, systems and computer program products that may be embodied in various forms. In addition, each of the examples given in connection with the various embodiments are intended to be illustrative, and not restrictive.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Consumers generally buy perishable items considering their expiration dates. Internet of things (IoT) enabled systems can be used for cultivation, and automated harvesting so there is an opportunity to notify consumers within a defined boundary when harvesting is in progress, and accordingly allow consumers to buy perishable items online when they are at their optimum development. For example, in the case of vegetables and/or fruits, consumer interest may be in purchase of the item furthest from an expiration/spoilage date. From the IOT enabled systems, consumers may participate in the activities when the items are being harvested, and accordingly with an appropriate mode of delivery decided, the items packaged to deliver them freshly to the consumers. The consumers can buy items and watching harvesting on real-time basis. In some examples, when the consumer is a food preparation professional, such as a master chef, the original flavors from different plants can be maintained in dishes and the consumers get an opportunity to select the right vegetable/fruit from a designated plant and in the right lifecycle phase from raw to ripe as their recipes demand.

Electronic noses exist that can model the smell from different fruits by measuring gaseous molecules, but there is a high level of subjectivity. As will be further described herein, in some examples, the methods and structures described herein provide for linking electronic nose devices to the specific nomenclature and personal capabilities of a consumer, such as a food preparation professional, e.g., master chef. In the case of food preparation, this can establish that the smell and the weight correlate to the right stage of development for a perishable item, e.g., fruit and/or vegetables, as required for the dishes. In some scenarios, with the increased popularity of organic farming, and less chemicals being used in the growth of produce, there is a reduced time between harvesting and use, because the spoilage time for the products is reduced due to loss of freshness. The methods, systems and computer program products described herein provide that consumers have the ability to participate and harvest their own perishable products, such own fruits, vegetables and plants, in which the control is provided to the consumers by internet of things (IoT) devices and information management. The methods, systems and computer program products for controlling the selection of perishable items using IOT devices dependent upon expiration dates for the perishable items is described with greater detail with reference to FIGS. 1-6.

In some embodiments, the methods and system by which internet of things (IoT) enabled harvesting and cultivation system will be integrated with online shopping and delivery system, accordingly appropriate customers will be notified when buying from the site of harvesting is enabled.

As depicted in FIG. 1, in some examples, the methods, systems and computer program products can be applicable to the harvesting of crops. In this example, the crops being harvested are the perishable items 57. It is noted that the methods, systems and computer program products that are described herein are not limited to only the example depicted in the environment illustrated in FIG. 1. For example, the methods, systems and computer program products may also be applicable to harvesting of fruits or fish. The methods, systems and computer program products described herein are applicable to any perishable item 57, e.g., any perishable item 57 for purchase by a consumer 10.

Figure 2:
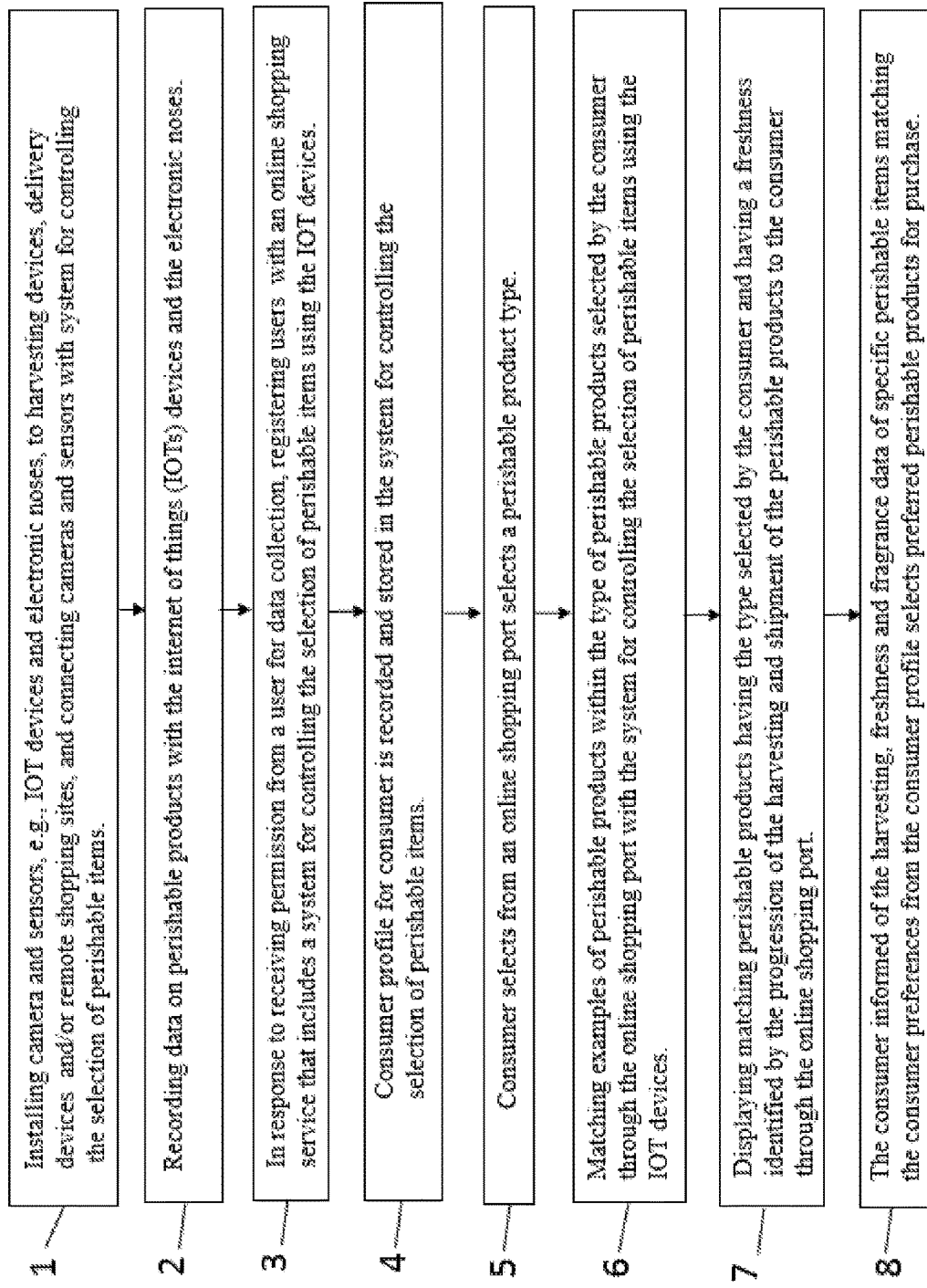
FIG. 2 is a block/flow diagram showing one embodiment of a method for the selection of perishable items using internet of things (IOT) devices, in accordance with an embodiment of the present invention.

FIG. 2 is a block/flow diagram showing one embodiment of a method for the analysis, tracking and assessment for the selection of perishable items 57 using IOT devices 50a, 50b, 50c, 50d dependent upon expiration dates for the perishable items 57. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 2, the method for selecting perishable items 57 based upon their time to expiration can begin at block 1 with installing camera and/or sensors, e.g., internet of things (IOT) devices 50a to harvesting devices 55, e.g., harvesting combines, as depicted in FIG. 1. The cameras and/or sensors, e.g., IOT devices 50b, may also be installed to delivery devices, e.g., delivery trucks 56, as well as cameras and/or sensors, e.g., IOT devices 50c, being installed at a remote shopping location, which can serve as a storage location for to be delivered products. Cameras and/or sensors, e.g., IOT devices 50d, may also be installed to drones 60. In the embodiment that is depicted in FIG. 1, the IOT devices 50a, 50b, 50c that are mounted/positioned on the harvesting devices 55, delivery trucks 56 and the storage location 50c may be cameras or other type devices that can record images of perishable products 57. In the embodiment that is depicted in FIG. 1, the IOT devices 50d, that are engaged to the drones 60 may be electronic noses. However, the IOT devices 50d engaged to the drones 60 may also include cameras. Each of these IOT devices 50a, 50b, 50c 50d may be in connection with the system 500 for controlling the selection of perishable items 57 using IOT devices 50a, 50b, 50c, 50d. As will be described below, the IOT devices 50a, 50b, 50c 50d may be in connection with the system 500 for controlling the selection of perishable items using IOT devices 50a, 50b, 50c, 50d over a network 14. The system 500 for controlling the selection of perishable items using IOT devices 50a, 50b, 50c 50d may communicate to the consumers 10 through an online shopping portal 65. More specifically, the system 500 can make a determination of the appropriate time within the production/growth cycle of a perishable product 57 that a specific consumer 10 wishes to purchase.

The internet of things (IOT) devices 50a, 50b, 50c, 50d employed by the system 500 can include cameras to capture images of the perishable items. As described herein, using image analysis, the IOT devices 50a, 50b, 50c, 50d can track the production/harvesting of the perishable items 57, and through the system 500 for selecting perishable items can report that information to the consumer 10, in which the consumer 10 may interact by selecting product through the online shopping portal 65.

The Internet of things (IoT) is the network of physical devices, vehicles, home appliances, and other items embedded with electronics, software, sensors, actuators, and connectivity which enables these things to connect, collect and exchange data. The IoT devices can be equipped with various types of sensors to collect information about themselves and their surroundings, and provide the collected information to the misplaced object locating system over a network, such as an internet connected network. As noted above, the IOT devices can be cameras. In other embodiments, the IOT devices can be sensors, such as temperature sensors, humidity sensors, sunlight sensors, or any other type of sensor that can measure variables, such as ambient atmosphere conditions, which can impact the development and/or spoilage of a perishable product. The IoT devices that are described herein can also be used to measure a fragrance of a perishable item 57. The fragrance of the perishable item 57 can be collected from an electronic nose, which may be one form of an IoT devices employed by the system 500 for controlling the selection of perishable items using IOT devices 50a, 50b, 50c, 50d.

In some embodiments, the IOT devices 50a, 50b, 50c, 50d installed in block 1 may cover cultivation fields with cameras, or the registration of the IOT devices at block 1 may integrate existing cameras into the system 500 for controlling the selection of perishable items 57 using the IOT devices 50a, 50b, 50c, 50d. The cameras in the cultivation fields can track the growth of perishable products.

Harvesting machines 56, such as automated and manual harvesting machines, may have various sensors and cameras installed. The harvesting machines 56 can be selected from the group consisting of combines shovels, tractors, two-wheeled tractors, wagons, backhoes, front-end loaders, cultivators, cultipackers, plows, moldboard plows, chisel plows, disk plows, harrows, plastic mulch layer tractor attachment, sprayers, seed drills, traditional seed drills, broadcast seeders, rotary spreaders, seeders, transplanters, mowers, scythes, sickles, rakes, balers, round balers, square balers, large square balers, combine, harvester, manure spreader, hydroponics systems and combinations thereof.

As will be described further, the feed from the IOT devices 50a, 50b, 50c, 50d on the harvesting machines 56, and cultivation areas will be shared with online shopping portal 65 on a real-time basis with the consumers 10 that have selected the perishable products 57 being tracked by the system 500.

The IOT devices 50a, 50b, 50c, 50d can be in communication with a system 500 for controlling the selection of perishable items using IOT devices 50a, 50b, 50c over a network 14 by a connection via a WiFi radio to establish a WiFi connection through a WiFi access point or router which couples the IOT devices 50a, 50b, 50c, 50d or IOT hub to the Internet (e.g., via an Internet Service Provider providing Internet service to the end user), which in turn connect to the IOT devices 50a, 50b, 50c, 50d/network 14. In other embodiments, the IOT devices 50a, 50b, 50c, 50d is in communication with include a cellular radio to establish a connection to the Internet via a cellular service such as a 4G (e.g., Mobile WiMAX, LTE) or 5G cellular data service. Of course, it should be noted that the underlying principles of the invention are not limited to any particular type of communication channel or protocol.

It is noted that information regarding the perishable products 57 may be measured using additional methods besides camera feeds. For example, the production cycle of a perishable product 57 may be measured by an electronic nose (which can be provided by the IOT device identified by reference number 50d). In some embodiments, drones 60 and robots bearing electronic nose sensors 50d track the smell of the perishable products 57, e.g., plants, fruits and vegetables, and the drones/robots share such information with the system 500 for controlling the selection of perishable items to feed to the client facing apps/browser/others. An electronic nose is a device intended to detect odors or flavors. The electronic nose of the drones 60 depicted in FIG. 1 may be in electrical communication with the system 500 for controlling the selection of perishable items using IOT devices 50a, 50b, 50c over the network 14.

In some embodiments, the electronic nose typically identifies odors by detecting the "fingerprint" of a chemical compound across an array of sensors monitored by pattern-recognition software. The smells detected by the electronic nose are composed of molecules, which has a specific size and shape. On example of a characterization of smells by electronic noses is provided in the publication Paul M. Wise "Quantification of Odor Quality" Chem. Senses 25: 429-443, pg 434 (2000).

Each of these molecules has a corresponding sized and shaped receptor in the human nose. When a specific receptor receives a molecule, it sends a signal to the brain and brain identifies the smell associated with the particular molecule. In some embodiments, the electronic noses work in a similar manner of human. The electronic nose uses sensors as the receptor. When a specific sensor receives the molecules, it transmits the signal to a program for processing. Essentially the electronic nose instrument consists of sensor array, pattern reorganization modules, and headspace sampling, to generate signal pattern that are used for characterizing smells. In some examples, the electronic nose consists of three major parts which are detecting system, computing system, sample delivery system.

The sample delivery system enables the generation of headspace of sample or volatile compounds which is a fraction analyzed. The system then sends this head space into the detection system of the electronic nose. The detection system can consist of a group of sensors is the reactive part of the instrument. When in contact with volatile compounds at that time the sensors reacts causing changes in electrical characteristics. Some examples of electronic sensors include Metal oxide semiconductor (MOSFET), metal oxide semiconductor (MOS) sensors, conducting polymers, quartz crystal microbalance, piezoelectric sensors and combinations thereof.

MOSFET sensors can be used for switching or amplifying electronic signals. The working principle of MOSFET is that molecules entering into the sensor area will be charged positively or negatively which have a direct effect on the electric field inside MOSFET. Metal Oxide Sensors (MOS) are sensors that are based on adsorption of gas molecules to provoke change in conductivity. This conductivity change is the measure of the amount of volatile organic compounds adsorbed. The adsorption of gas onto the surface of the polymer leads to change in mass on the sensor surface. This is in turn produces a change in the resonant frequency of the crystal. Quartz crystal microbalance sensors are a way of measuring mass per unit area by measuring the change in frequency of crystal resonator. This can be stored in a data base. Conducting polymers, e.g., conductive polymer gas sensors, operate based on changed in electrical resistance caused by adsorption of gases onto the sensor surface.

In most electronic noses, each sensor is sensitive to all molecules in their specific way. However, in bioelectric noses the receptor proteins which respond to specific smell molecules are used. Most of electronic noses use sensor arrays that react to volatile compounds. Whenever the sensors sense any smell, a specific response is recorded that signal is transmitted into the digital value. The digital output generated by electronic nose sensors has to be analyzed and interpreted. There are three main types techniques for interpreting the data measured using the aforementioned sensors, in which the choice of method utilized depends on available input data from sensors. In one embodiment, the data reduction is a graphical analysis useful for comparing samples or comparing smells identification elements of unknown analysts relative to those of known sources in reference libraries. The multivariate data analysis generates a set of techniques for the analysis of data that is trained or untrained technique. The untrained techniques are used when a data base of known samples has not been built previously. One example of an untrained MDA technique is a principle component analysis. The electronic nose data analysis MDA is a very useful when sensors have partially coverage sensitivities to individual compounds present in a sample mixer. The neural network is the best known and most derived analysis techniques utilized in a statistical software packages for commercially available electronic nose. The measurements taken by the electronic noses 50d can be provided through the online portal to the consumer 10 through the system 500 for controlling the selection of perishable items using the IOT devices 50a, 50b, 50c. In some embodiments, the electronic nose measurements can be mapped to the smell related classification as listed in the consumer profile 43 of a consumer 10 that is registered with the system 500 for controlling the selection of perishable items using IOT devices 50a, 50b, 50c.

The system 500 for controlling the selection of perishable items 57 using the IOT devices 50a, 50b, 50c may also include data feed regarding storage of the perishable item 57, and delivery times in the time period from harvesting the perishable product 57 to delivery of the perishable product 57. In some embodiments, delivery vehicles 56 can be placed around the harvesting area, and drones 60 can be used for picking the selected items from the harvesting machine 55 to the packaging area 58 for packaging, and delivery to the consumer 10. In some embodiments, IOT devices 50b can be affixed to the delivery vehicles 56, e.g., delivery trucks, in which the IOT devices 50b can include cameras for identifying goods, and sensors, e.g., times, for measuring delivery times for the goods being delivered from the harvesting area to the point of delivery. In some embodiments, once the packaging is done, the delivery vehicles will be scheduling the delivery of the fresh items to the customer location, in this case appropriate supporting systems can be used, like refrigeration, during delivery that are based on the order and computation to determine if the maturing period includes the transportation period or not.

The measurements taken by the electronic noses 50d can be provided through the online portal 65 to the consumer 10 through the system 500 for controlling the selection of perishable items 57 using the IOT devices 50a, 50b, 50c.

Figure 3:
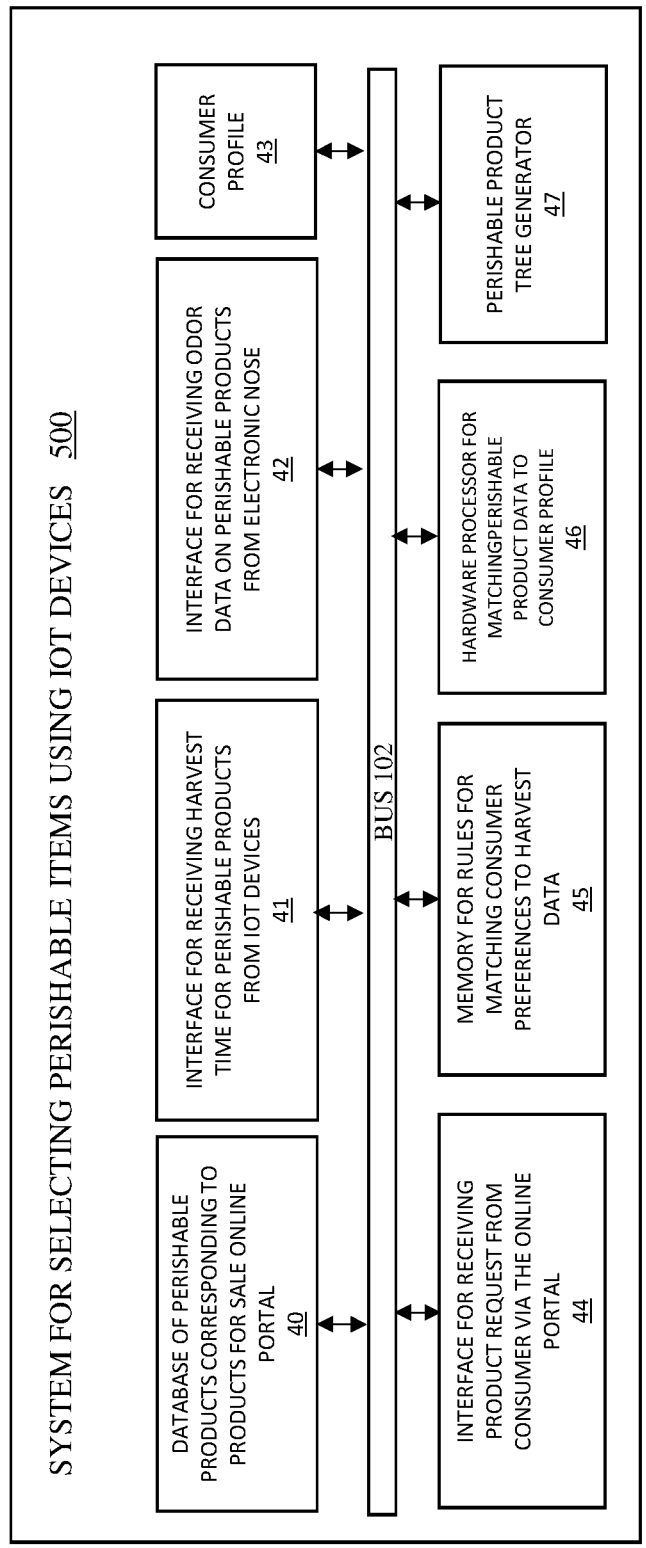
FIG. 3 is a block diagram illustrating a system for the selection of perishable items using internet of things (IOT) devices, in accordance with one embodiment of the present disclosure.
Figure 4:
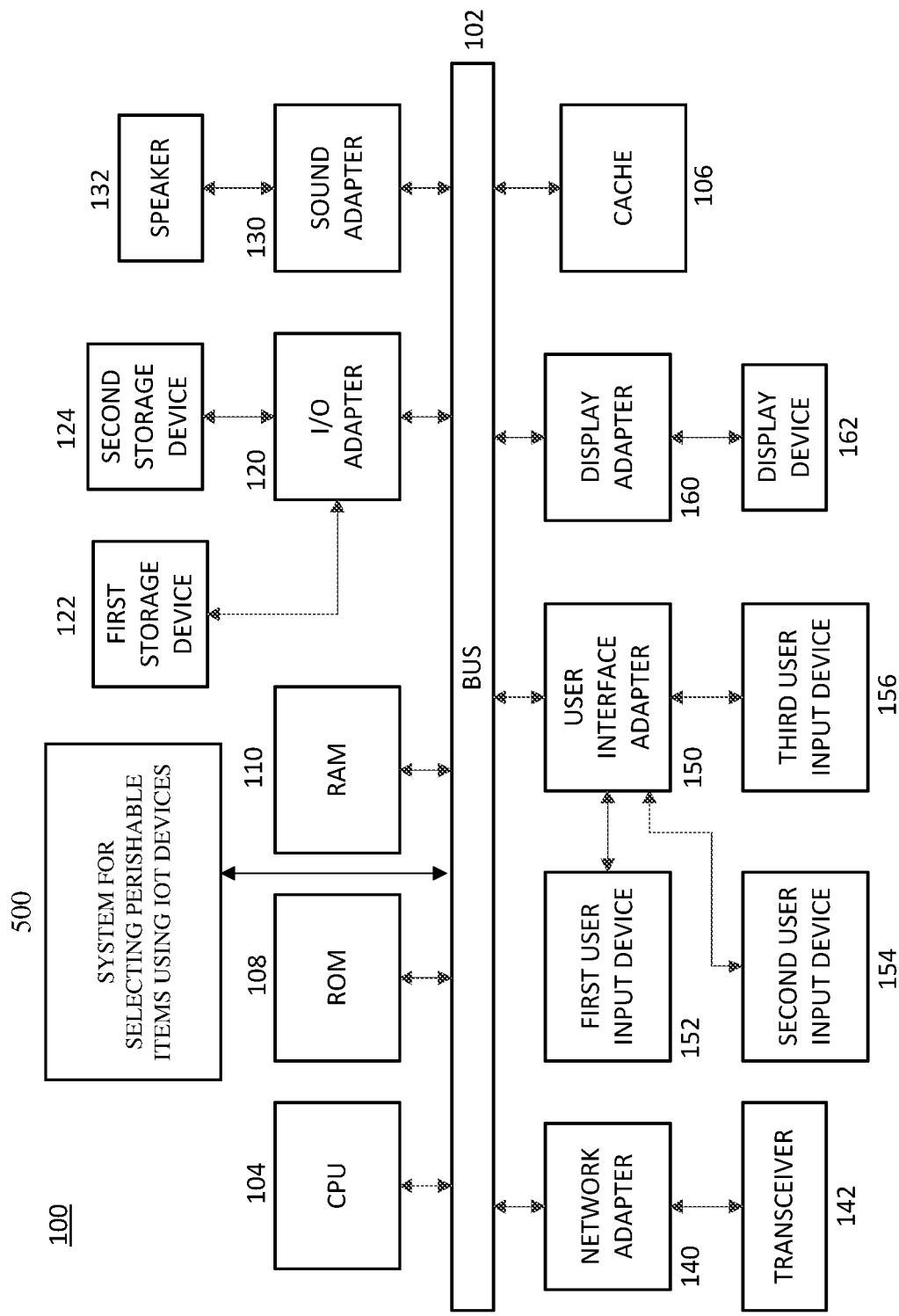
FIG. 4 is a block diagram illustrating a system that can incorporate the system depicted in FIG. 3 for the selection of perishable items using IOT devices, in accordance with one embodiment of the present disclosure.

Following connection of the IOT devices 50a, 50b, 50c, 50d with the system 500 for controlling the selection of perishable products 57, and connection of the electric nose carrying devices to the perishable products 57, the system 500 can record harvesting/production of perishable products 57. FIG. 3 is a block diagram illustrating a system 500 for controlling the selection of perishable items using IOT devices 50a, 50b, 50c, 50d dependent upon expiration dates for the perishable items 57. In one embodiment, the system 500 can include an interface, e.g., interface 14 for receiving harvest time for perishable products 57, for receiving data from the IOT devices 50a that are affixed to the harvesting devices 56 and/or to IOT devices, which may be monitoring fields of perishable products 57 that are being cultivated. The interface 41 for receiving harvest time for perishable products 57 may include at least one receiver for receiving data over the network 14 from the IOT devices 50a, 50b, 50c, 50d, and may save the data in an associated module of hardware memory. The system 500 for controlling the selection of perishable items using IOT devices 50a, 50b, 50c, 50d may also include a database 40 of perishable products 57 that correspond to products for sale on an online portal 65. This database 40 may include at least one hardware memory device that can store data for each perishable product 57 that is being tracked by the system 500, which it is receiving data for from the IOT devices 50a, 50b, 50c, 50d through the interface 41 for receiving harvest time for perishable products 57.

Referring to FIG. 3, the system 500 for controlling the selection of perishable items 57 using IOT devices 50a, 50b, 50c, 50d may also include an interface 42 for the transmission of data from the electronic nose to the system 500, e.g., interface 42 for receiving odor data on perishable products from the electronic nose 42. Similar to the interface 41 for receiving harvest time for perishable products 57 that is in communication with the IOT devices 50a, 50b, 50c, 50d, the interface 42 for receiving odor data from the electronic nose 50d also receives data over the network 14.

The IOT devices 50a, 50b, 50c, 50d and the electronic nose sensors 50d provide a network of sensors for measuring characteristics of the perishable products 57 as they are being harvested and during the storage of the perishable products 57 prior to delivery, which is employed by the system 500 for controlling the selection of perishable items 57. The system 500 for controlling the selection of perishable items 57 using the IOT devices 50a, 50b, 50c, 50d communicates information regarding the harvesting characteristics to the consumers 10 through the online purchasing portal 65 through which the consumer 10 orders the perishable items 57 for purchase.

Referring to FIG. 2, the method may continue at block 2 with the system 500 for controlling the selection of perishable items 52 using the IOT devices 50a, 50b, 50c, 50d to record images and fragrance data using the electronic noses 50d for the perishable products 57 that are being harvested. The images taken by the camera's, e.g., IOT devices 50a, 50b, 50c, 50d of the harvesting equipment in addition to the measurements taken by the electronic noses 50d is data that is provided through the network 14 to the system 500 for controlling the selection of perishable items using the IOT devices 50a, 50b, 50c. The system 500 for controlling the selection of perishable items using the IOT devices 50a, 50b, 50c can then perform analytics of the data to provide analytics on the maturity of the product from raw to fully developed. For example, the images taken by the IOT devices 50a, 50b, 50c, 50d may be used to determine the maturity, e.g., weight, of perishable items using stalk bending calculations.

In some embodiments, taking into a consideration of maturity of perishable products 57, e.g., apples, from an identified plant/tree, the camera and sensor feed can be shared with online shopping portal 65 with analytics provided by the system 500 for controlling the selection of perishable items 57 using the IOT devices 50a, 50b, 50c on the maturity of the product from raw to fully developed and identification of plants for consumers 10 seeking items from the identified plant/tree. Before identifying the appropriate products, i.e., perishable items 57, for the consumer 10, data is captured by the system 500 through the aforementioned sensors 50a, 50b, 50c, 50d. Referring to FIG. 3, for example, the system 500 for controlling the selection of perishable items 57 using the IOT devices 50a, 50b, 50c receives harvesting data from the IOT devices 50a, 50b, 50c over the network 14 to the interface 41 for receiving harvest time for perishable products from IOT devices 50a, 50b, 50c, 50d and the system 500 receives fragrance data from the electronic noses 50d over the network 14 to the interface 42 for receiving odor data on perishable products. The electronic nose 50d may be mounted on robots/drones 60 and can measure the scent from the plant, fruit or vegetables. The data recorded may be stored in the database 40 of perishable products corresponding to the product for sale in the online portal.

Referring to FIG. 2, the method may further include registering users, i.e., consumers 10, with an online shopping portal 65 to the system 500 for controlling the selection of perishable items 57 using IOT devices 50a, 50b, 50c, 50d dependent upon expiration dates for the perishable items 57, e.g., produce items, at block 3. Registry information can be saved in a consumer profile 43, which may be a module of memory in the system 500 for controlling the selection of perishable items using IOT devices 50a, 50b, 50c, 50d. The consumer profile 43 includes connection data for connecting the system 500 for controlling perishable items with the online shopping portal 65 being used by the consumer 10.

The online shopping portal 65 is an interface allowing one to perform online shopping. The online shopping portal 65 may be via a web page being displayed on the user interface of a computer terminal, which can be a desktop computer, a laptop computer, a tablet computer or a mobile device, such as mobile phone, e.g., smart phone. Online shopping through the online shopping portal 65 is a form of electronic commerce which allows consumers to directly buy goods or services from a seller over the Internet using a web browser. Consumers 10 can find a product of interest by visiting the website of the retailer directly or by searching among alternative vendors using a shopping search engine, which displays the same product's availability and pricing at different e-retailers. In the methods, systems and computer program products of the present disclosure, a system 500 for controlling the selection of perishable items using IOT devices 50a, 50b, 50c, 50d can function as a module of the online shopping that provides information to the consumer 10 in real time regarding a timeline of harvesting/production of a perishable product. From that timeline, the user can select perishable items 57 based upon their timing within the timeline, e.g., to select a perishable item 57 at its optimum freshness. For example, if the consumer 10 has a preference for a perishable item 57, such as an apple, having a ripeness between a specific time period from harvesting to deliver, the system 500 for controlling the selection of perishable items 57 using IOT devices 50a, 50b, 50c can provide that data to the consumer 10 that is shopping using the online shopping portal 65. Additionally, the consumer 10 may have a consumer profile for specific perishable items. As will be described herein, in some embodiments, the system 500 for controlling the selection of perishable items using IOT devices 50a, 50b, 50c, 50d can provide data other than timing/freshness/etc. For example, a consumer 10 may have a preference for an odor for their produce, which can be tied to the growth and/or stage of harvesting of a particular perishable item 57. The IOT devices 50a, 50b, 50c, 50d described herein can provide product odor information via electronic sensors/electronic noses that are linked to the system 500 to the consumers 10.

In some embodiments, in response to receiving permission from a user 10 for data collection, the method may begin with registering users, i.e., consumers 10, with the system 500 for controlling the selection of perishable items 57 using IOT devices 50a, 50b, 50c, 50d which provides for a method of tracking perishable items 57 during a purchase cycle of a consumer 10. The data collected may be employed to provide a user profile, e.g., consumer profile 43, as depicted in FIG. 3.

To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

At block 4 of the method depicted in FIG. 2, the consumer 10 creates a consumer profile 43 with the system 500 for controlling the selection of perishable items 57 using the IOT devices 50a, 50b, 50c, 50d. The consumer profile 43 may be created by historical information saved by the system 500 from the consumer 10 interactions with the online shopping portal 65 to purchase perishable items 57 being tracked by the system 500. The consumer profile 43 may include information on the consumer 10, such as the time in the harvesting cycle at which a consumer 10 prefers for perishable items 57 to be selected for purchase by the consumer 10. Additionally, the consumer profile 43 may also include the delivery information for the consumer 10. For example, address information and delivery information for the consumer 10 may be saved in the consumer profile 43. The address information is the delivery address for the perishable items 57 that can be ordered by the consumer 10 through the online shopping portal 65. The address information in addition to including the physical address for the consumer 10 may also include information directed to the ambient conditions at the physical address for delivery, in which the ambient conditions can include temperature, lighting, humidity, as well as any other ambient conditions that can impact the freshness of the perishable items 57. Delivery information may include timing for shipments to reach the delivery address. For example, how long it will take for a perishable item 57 to be shipped from the harvesting address to the delivery address. This information can include traffic patterns, delivery methods, e.g., trucking vs. shipment by air travel, as well as the different environments that would be experienced by the perishable products 57 in transit from the harvest point the physical address for delivery. The different environments can have different ambient conditions which can impact the freshness of the perishable item 57. In some embodiments, a remote server can identify the delivery capabilities, like availability of technologies to deliver the within a distance and the item remain fresh etc.

The consumer profile 43 may include fragrance preferences for perishable items 57 to be purchased by the consumer 10. The fragrance preferences for the perishable items 57 can be entered manually by the consumer 10, or the fragrance preferences can be determined from measurements of perishable products 57 that have been historically purchased by the consumer 10. Fragrances for the historically purchased perishable items 57 may be measured using an electronic nose 50d.

It is further noted, that in some embodiments, the consumer profile 43 may be accessible by other consumers than the consumer specifically identified in the profile. This provides that one consumer having a similar address and interest in perishable products 57 as the consumer in the consumer profile 43 can employ the data for the consumer profile 43 in order to purchase perishable products 57 at their optimum freshness. The consumer 10 for which the consumer profile 43 is recorded has the choice of whether their data may be shared with out consumers.

Once a user has registered with the system 500 for controlling the selection of perishable items using IOT devices 50a, 50b, 50c, 50d the consumer 10 can receive real time broadcast from the IOT devices 50a, 50b, 50c, 50d of real-time harvesting procedure, and the temporary storage of the items in the online shopping portal 65, and allow the online customer 10 to buy the items when the harvesting is in progress. For example, the online shopping portal 65 allows a user 10 that is shopping online to select a type of product for purchase. This may be done over an interface over the internet network 14. A vendor provides the products for purchase by the consumer 10 over the online shopping portal 65. In some embodiments, the system 500 for controlling the selection of perishable items using IOT devices 50a, 50b, 50c, 50d is a module of the online shopping portal 65. Once the user 10 selects a product for sale from the online shopping portal, the system 500 for controlling the selection of perishable items using IOT devices 50a, 50b, 50c, 50d can track the product of interest by the consumer 10.

Referring to FIG. 2, the consumer 10 can select a perishable product type for sale at block 5. By "perishable product type" it is meant that categories of perishable products, e.g., a type of apple, such as gala, green, red, etc. Perishable product types can be types of fruits, vegetables, meats etc.

The consumer 10 can select the perishable product type using an online shopping portal 65. The system 500 for controlling the selection of perishable items using IOT devices 50a, 50b, 50c, 50d receives the request for the perishable product type from the online shopping portal 65. The system 500 for controlling the selection of perishable items using the IOT devices 50a, 50b, 50c receives the perishable product type selected by the consumer 10 over the network 14 through the interface for receiving product requests from the consumer 44.

At block 6 of the method illustrated in FIG. 2, the method can continue with matching examples of perishable goods 57 with the type of perishable products selected by the consumer 10 through the online shopping port 65 according to freshness and the consumer preferences. More specifically, after the user 10 has selected a perishable product type, the system 500 compares the consumer preferences from the consumer profile 43 for the perishable product type, and then matches the consumer preferences to the stored data from the sensors, e.g., electronic noses 50d, and cameras that are provided by the IOT devices 50a, 50b, 50c, 50d monitoring the harvest for perishable products 57 matching the perishable product type that was selected by the user 10 through the online shopping portal 65.

The system 500 for controlling the selection of perishable items using IOT devices 50a, 50b, 50c, 50d includes at least one hardware processor 46 for matching perishable product data, e.g., harvesting information from the IOT devices 50a, 50b, 50c, 50d, and fragrance data from electronic noses 50d measuring items within the harvest, to the data from the consumer profile 34. To match the consumer preferences and data recorded from the products being harvested, the hardware processor 46 may employ artificial intelligence. For example, the hardware processor 46 may be integrated into an artificial intelligence providing device, such as an artificial neural network providing device. An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

In some embodiments, the hardware processor 46 for the system for controlling the selection of perishable items 57 using IOT devices 50a, 50b, 50c, 50d may employ video tracking/image recognition for matching perishable products 57 being monitored during harvesting with the consumer preferences. Video tracking may employ artificial intelligence utilizing computer software programs that analyze the images from video surveillance cameras in order to recognize humans, vehicles or objects, which all may be equipment 10 that is being tracked. The A.I. program functions by using machine vision. Machine vision is a series of algorithms, or mathematical procedures, which work like a flow-chart or series of questions to compare the object seen, which may be perishable products 57 from the harvest, with hundreds of thousands of stored reference images of equipment in different angles, positions and movements. Combining all of the values from the various questions, an overall ranking is derived which gives the A.I. the probability that a perishable product 57 being tracked meets the preferences of the consumer 10 from the consumer profile 43. This type of A.I. is known as "rule-based" because a programmer sets rules for all of the perishable products 57 that can be purchased from the online shopping portal 65, and may have harvesting data relative to freshness that is of interest to a consumer 10 in making a purchase decision.

Referring to FIG. 3, the system 500 for controlling the selection of perishable items using IOT devices 50a, 50b, 50c includes at least one hardware processor 46 for matching perishable product data, e.g., harvesting information from the IOT devices and fragrance data from electronic noses measuring items within the harvest, to the data from the consumer profile 34. In some embodiments, the system 500 also includes memory, e.g. hard-drive and/or solid state drive, that houses the program including the rules for matching harvest data to the preferences of the consumer from the consumer profile 43.

In some embodiments, using historical data, the intelligent system can identify that the customer is willing to buy fresh items directly from the cultivation fields. In this case blockchain can be used to retain the consumer and product matches. For example, if consumers selects specific plants or trees to be their source, i.e., perishable product 57, and are choosing a defined maturity stage, it can be seen live, approved and then harvested or when the customers reach the site, they can be directed to the plants and trees that have the vegetables and fruits at that level of maturity due to the IOT data that is captured. In some embodiments, the pre-processing based on the specified needs for different requirements of a perishable product can be done at the harvest point itself cutting down cost and time from the harvesting the perishable product, e.g., tree to the table or the plant, to the ultimate use for the product.

Referring to FIG. 2, the method may continue at block 7 with displaying matching perishable products to the consumer 10 through the online shopping port 65, the identified perishable products having the type selected by the consumer 10, and having a freshness identified by the progression of the harvesting and an estimate of the shipment time for the perishable products to the consumer. In some embodiments, freshness data is depicted on the display to the consumer for the matched perishable items and includes a live video feed of said perishable items being harvested. In some embodiments, the freshness data depicted on the display to the consumer for the matched perishable items includes a fragrance description measured from an electronic nose 50d.

In some embodiments, the status of the perishable items 57 being tracked can be arranged on a tree displayed to the consumer 10 through the online shipping portal 65, in which each branch of the tree indicates a state of development, or a step in the production of the perishable product.

Referring to FIG. 3, the perishable product tree generator 45 of the system 500 for controlling the selection of perishable items 57 using IOT devices 50a, 50b, 50c, 50d is an interface that is in electrical communication with the online shopping portal 65, and can provide the display to the consumer 10 through which the consumer 10 can be presented information regarding the freshness of a perishable product, fragrance of a perishable product and/or any other data that relays information on the harvesting of perishable products that may be relevant to the consumer 10 based on their consumer profile 43.

Referring to FIG. 2, at block 8, the consumer 10 may select a perishable product 57 through the online shopping portal 65 from the displayed products that have been selected for potentially matching the preferences of the consumer profile by the system 500 for controlling the selection of perishable items using IOT devices 50a, 50b, 50c, 50d. In some embodiments, matching examples of perishable goods with the type of perishable products selected by the consumer 10 through the online shopping port 65 includes image video tracking/recognition techniques to allow a consumer 10 to select a particular item from the video screen. In some embodiments, from a video screen, the consumer 10 can elected a specific item, e.g., an apple, and accordingly the harvesting device will know which item is selected. Also, in one example, the customer can look at the immediate history of the weight growth through bend of the stalk measurements if necessary. In some embodiments, using an electronic nose 50d that is robotic driven, e.g., driven by a drone 60, the consumer 10 can have the smell of the purchase detected and make decisions appropriately. Search, align and adjust smell classes of a customer from the learning—the measured chemical combination's reference to existing smell class across the base of shared classes and with input from the user, adjusting the bias, band or introducing a new smell class. In this case, as real-time video is being broadcasted, the consumer 10 can select any item from the tree, or from temporary storage location, and with image recognition, the actual physical object will be recognized, and the robotic system will be picking the item for delivery to the customer.

In some embodiments, based on available delivery capacity, and the distance that perishable items 57 can be delivered to keep the item fresh, as well as the technology available to keep the items fresh within a defined time range, e.g., refrigeration, the system 500 for controlling the selection of perishable items using IOT devices 50a, 50b, 50c can provide an online shopping experience that can notify the consumers 10 signed into the online shopping portal 65 with a defined boundary of time in which a perishable product will remain fresh. Further, the system 500 for selecting perishable items using IOT devices 50a, 50b, 50c, 50d can allow consumers 10 to buy fresh items within the defined boundary of time set by the system 500 for controlling the selection of perishable items using IOT devices 50a, 50b, 50c.

In some embodiments, once the consumer 10 is logged into the online shopping portal 65 that is in communication with the system 500 for selecting perishable items 57 using the IOT devices 50a, 50b, 50c, 50d the consumer 10 may select any specific item when the item is on the tree or in any specific temporary storage location. Accordingly, with image recognition methods, a perishable item 57 can be recognized, and the same will be mapped with physical item in the harvesting area, and accordingly the same will be delivered to the customer. In one example, fruit/vegetable weights can be calculated using the mechanics of the stalk bend over referenced periods.

In some embodiments, the harvesting procedure will be integrated with online shopping portal, so that the notified customers can be shown real-time video and sensor feed of the items are being harvested. In the online shopping portal, the notified customer can view the items are being harvesting, the identity creation (existing art) and tagging, and the packaging.

In some embodiments, the system for system 500 for controlling the selection of perishable items using IOT devices 50a, 50b, 50c, 50d will proactively be notifying the consumers 10 about the timing of harvesting.

In some embodiments, the consumer 10 can specify the quantity or volume of the items that the consumer wants to buy directly from the harvested area. Once the required items are selected or quantity of items are selected, then a remote shopping system will be identifying the customer address, quantities, and the items etc.

FIG. 3 is a block diagram illustrating a system 500 for controlling the selection of perishable items using IOT devices 50*a*, 50*b*, 50*c*, 50*d* dependent upon expiration dates for the perishable items 57. As described with reference to FIGS. 1 and 3, the system 500 may include a registry for consumers, in which the system for controlling the selection of perishable items 57 collects data from the consumers 10 for recording a consumer profile 43, the consumer profile 43 including consumer preferences for freshness of the perishable items 57, wherein the consumers can revoke permission to the system 500 at any time.

The system 500 may also include an interface 44 with an online shopping portal through which the consumer selects perishable item types. This interface can be a transceiver.

The system 500 can also include at least one interface 41, 42 for receiving harvest data on perishable items 57 within the perishable item types from internet of things (IOT) devices 50*a*, 50*b*, 50*c*, 50*d*. For example, the at least one interface 41, 42 may include an interface for receiving images 41 from the IOT devices 50*a*, 50*b*, 50*c* cameras for taking optical images of perishable products 57 being harvested. In some embodiments, the optical images of perishable products 57 being harvested measure freshness of the products being harvested by measurements of stalk bending. In another example, the at least one interface 41, 42 may include an interface 42 for receiving fragrance data on perishable products from an electronic nose 50*d*. In one example, the electronic nose 50*d* is mounted to a drone 60.

The system 500 further includes at least one hardware processor 46 for comparing the harvest data measured with the IOT devices 50*a*, 50*b*, 50*c*, 50*d* on the perishable items within the perishable item type to the consumer preferences for freshness from the consumer profile to provide the matched perishable items. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

The at least one hardware processor for comparing the harvest data measured with the IOT devices on the perishable items within the perishable item type to the consumer preferences for freshness from the consumer profile can employ artificial intelligence for matching the perishable items having freshness data to the consumer preferences from the consumer profile.

These and other variations of a hardware processor subsystem are also contemplated in accordance with embodiments of the present invention.

Still referring to FIG. 3, the system 500 for controlling the selection of perishable items using IOT devices 50*a*, 50*b*, 50*c*, 50*d* may include a transmitter for transmitting a display of the matched perishable items 57 to the consumer through the online shopping portal, in which the display depicts freshness data to the consumer for the perishable items. In one example, the transmitter can include a perishable product tree generator 45. The freshness data depicted on the display to the consumer 10 for the matched perishable items can include a live video feed of said perishable items being harvested. In other examples, the freshness data depicted on the display to the consumer 10 for the matched perishable items includes a fragrance description measured from an electronic nose 50*d*.

Each of the components for the system 500 that is depicted in FIG. 3 may be interconnected via a system bus 102.

Any of the systems or machines (e.g., devices) shown in FIG. 3 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIG. 3, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 5:
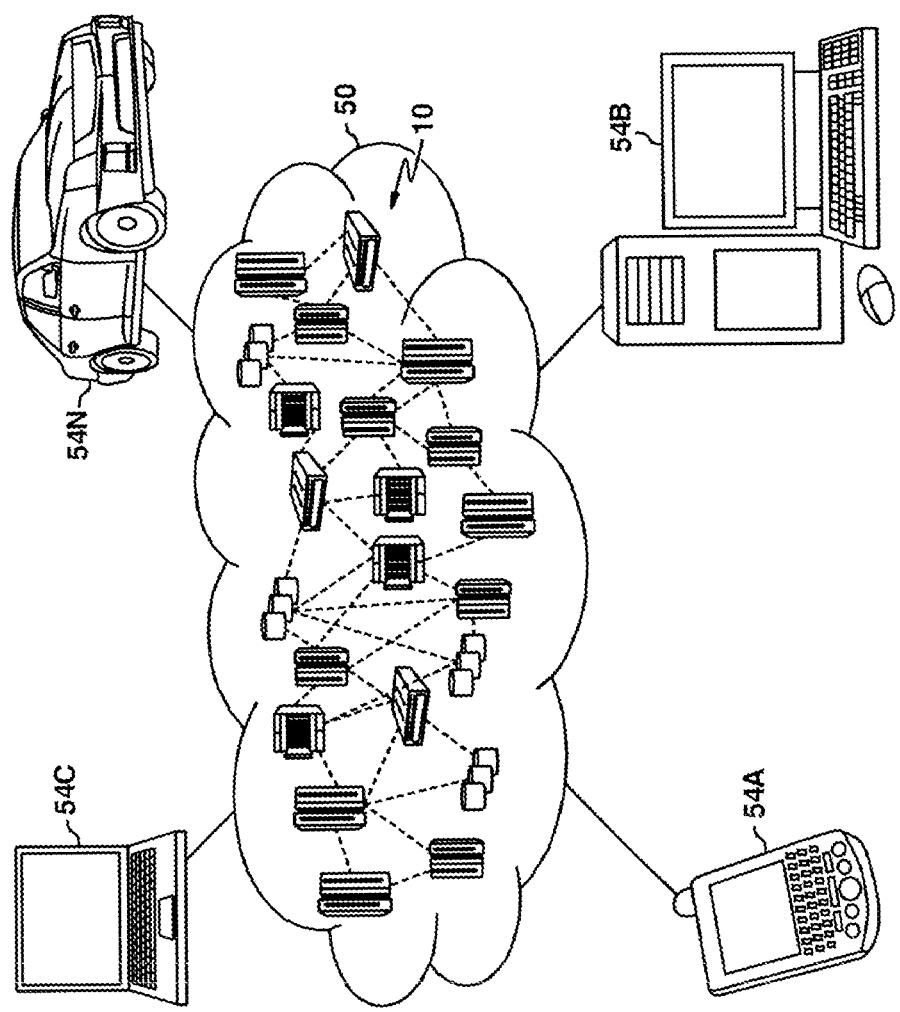
FIG. 5 depicts a cloud computing environment according to an embodiment of the present disclosure.

The system 500 for controlling the selection of perishable items using IOT devices 50*a*, 50*b*, 50*c*, 50*d* may be integrated into the processing system 100 depicted in FIG. 5. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium may be non-transitory. In one embodiment, a computer readable storage medium is provided that includes a computer readable program for the selection of perishable items using IOT devices, wherein the computer readable program when executed on a computer causes the computer to perform the steps of registering a consumer to a system that assists the selection of perishable items using IOT devices based upon consumer preferences, in which the system collects data from the user, wherein the user can revoke permission to the system at any time; and monitoring harvesting of a plurality of perishable item types using a plurality of internet of things (IOT) devices. The method performed by the steps stored on the computer readable storage medium also provides for recording to the system that assists in the selection of perishable items freshness data from the perishable items within the perishable item types being monitored during said harvesting; and recording a consumer profile on the system that assists in the selection of perishable items from the consumer including consumer preferences for freshness of perishable items. The method may further include selecting a perishable item type by the consumer through an online shopping portal that is linked to the system that assists the selection of perishable items using IOT devices based upon consumer preferences; and matching perishable items with the system that assists the selection of perishable items using IOT devices within the perishable item type having freshness data from monitoring the harvest to the consumer based upon consumer preferences from the consumer profile to provide matched perishable items. In some embodiments, the instructions stored on the computer readable storage medium includes the step of transmitting a display of the matched perishable items to the consumer through the online shopping portal, in which the display depicts freshness data to the consumer for the perishable items.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 51 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 51 and cloud computing environment 50 can communicate with any type of computerized device over any type of network and/or network addressable connection (e.g., using a web browser).

Figure 6:
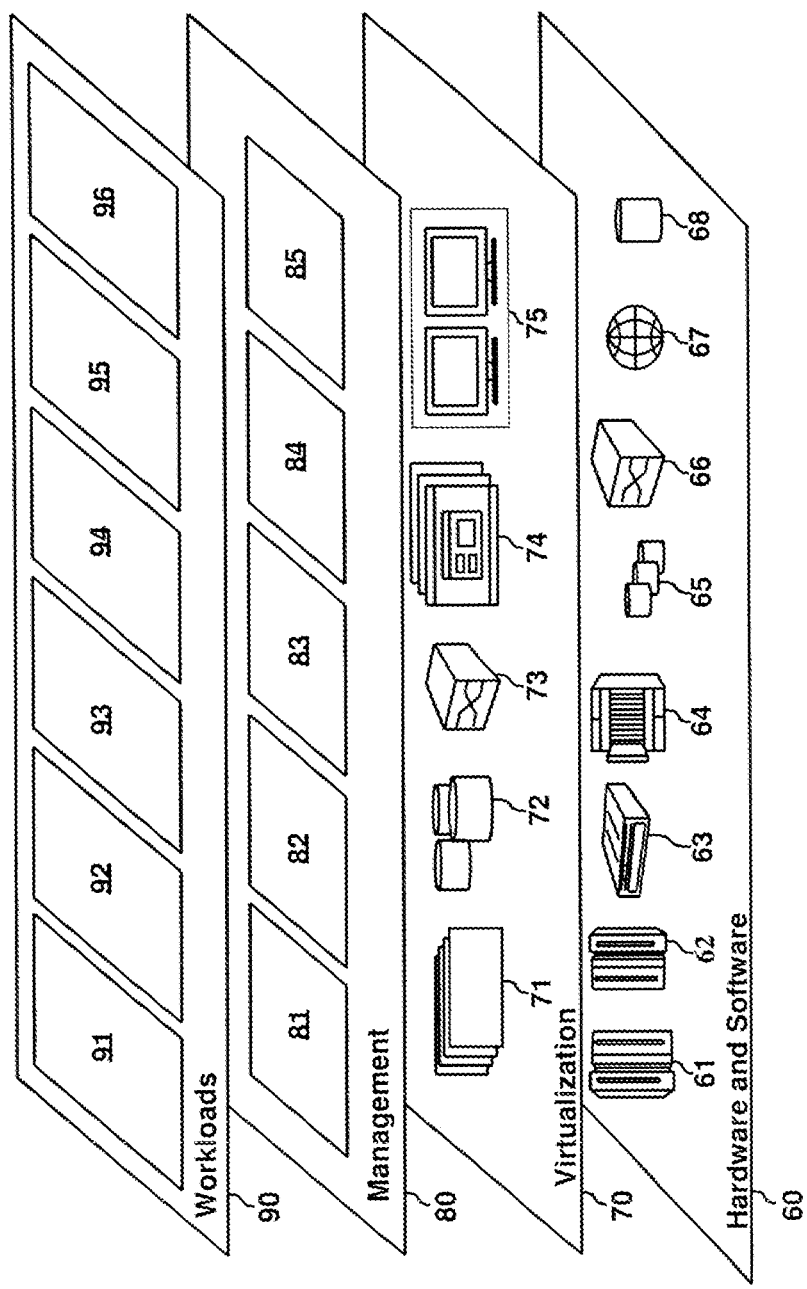
FIG. 6 depicts abstraction model layers according to an embodiment of the present disclosure.

Referring now to FIG. 6, a set of functional abstraction layers provided by cloud computing environment 50 (FIG. 6) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the system 500 for controlling the selection of perishable items using IOT devices 50a, 50b, 50c, 50d, which is described with reference to FIGS. 1-4.

Having described preferred embodiments of a system and method for using internet of things (IOT) devices to select perishable items by the time of expiration (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for analyzing and tracking perishable items for selection of perishable items using IOT devices comprising:

registering a consumer to a system that assists with selection of perishable items using IOT devices based upon consumer preferences, in which the system collects data from a user in response to the consumer granting permission to the system, and wherein the consumer can revoke permission at any time;

monitoring harvesting of a plurality of perishable item types using a plurality of internet of things (IOT) devices, wherein the IOT devices comprise cameras for taking optical images of perishable products being harvested;

recording to the system freshness data that assists in the selection of perishable items from the perishable items within the perishable item types being monitored during said harvesting, the monitoring including images and fragrance measurements from the IOT devices indicative of freshness;

recording a consumer profile on the system that assists in the selection of perishable items from the consumer including consumer preferences for freshness of perishable items according to a consumer preferred harvest cycle based on historical purchases of perishable items having corresponding images and fragrance preferences;

selecting a perishable item type by the consumer through an online shopping portal that is linked to the system that assists the selection of perishable items using IOT devices based upon consumer preferences from the consumer preferred harvest cycle;

matching perishable items to the consumer preferences with the system that assists the selection of perishable items using IOT devices within the perishable item type having freshness data from monitoring the harvest to the consumer based upon consumer preferences from the consumer profile to provide matched perishable items to the consumer preferred harvest cycle, wherein the matching perishable items comprises an artificial neural network that matches the images and fragrance measurements from the IOT devices indicative of freshness to the consumer preferences for freshness of perishable items according to the consumer preferred harvest cycle based on the historical purchases of the perishable items having the corresponding images and the fragrance preferences; and transmitting a display of the matched perishable items to the consumer through the online shopping portal, in which the display depicts freshness data to the consumer for the perishable items, wherein the freshness data depicted on the display to the consumer for the matched perishable items includes a live video feed of the perishable items being harvested at a cultivation site and includes the images from the IOT devices that illustrate freshness.

2. The computer implemented method of claim 1, further comprising the consumer selecting perishable items from the display.

3. The computer implemented method of claim 1, wherein the IOT devices comprise cameras for taking optical images of perishable products being harvested.

4. The computer implemented method of claim 3, wherein the optical images of perishable products being harvested measure freshness of the products being harvested by measurements of stalk bending.

5. The computer implemented method of claim 1, wherein the IOT devices comprise electronic noses for measuring fragrances of perishable products being harvested.

6. The computer implemented method of claim 5, wherein the electronic nose is mounted to a drone.

7. The computer implemented method of claim 1, wherein the system that assists the selection of perishable items using IOT devices employs artificial intelligence for said matching the perishable items having freshness data to the consumer preferences from the consumer profile to provide the matched perishable items.

8. The computer implemented method of claim 1, wherein said freshness data depicted on the display to the consumer for the matched perishable items includes a fragrance description measured from an electronic nose.

9. A system for controlling the selection of perishable items using TOT devices comprising:
  a registry for consumers, in which the system for controlling the selection of perishable items collects data from the consumers for recording a consumer profile, the consumer profile including consumer preferences for freshness of the perishable items recorded from historical consumer preferences of perishable items based upon preferred harvest cycle having corresponding images and fragrance preferences, wherein the consumers can revoke permission to the system at any time;
  an interface with an online shopping portal through which the consumer selects perishable item types;
  at least one interface for receiving harvest data on perishable items within the perishable item types from internet of things (IOT) devices, wherein the IOT devices comprise cameras for taking optical images of perishable products being harvested at a cultivation site, the images from the IOT devices indicative of freshness and the IOT devices including fragrance sensors for fragrance measurements indicative of freshness;
  at least one hardware processor for comparing the harvest data measured with the IOT devices on the perishable items within the perishable item type to the consumer preferences for freshness from the consumer profile to provide matched perishable items, the matching perishable items designated by an artificial neural network that matches the images and fragrance measurements from the IOT devices indicative of freshness to the consumer preferences for freshness of perishable items according to the consumer preferred harvest cycle based on the historical purchases of the perishable items having the corresponding images and the fragrance preferences; and
  a transmitter for transmitting a display of the matched perishable items to the consumer through the online shopping portal, in which the display depicts freshness data to the consumer for the perishable items, wherein the freshness data depicted on the display to the consumer for the matched perishable items includes a live video feed of the perishable items being harvested and includes the images of the TOT devices that illustrate freshness.

10. The system of claim 9, wherein the at least one interface includes an TOT interface to TOT devices comprising cameras for taking optical images of perishable products being harvested.

11. The system of claim 10, wherein the optical images of perishable products being harvested measure freshness of the products being harvested by measurements of stalk bending.

12. The system of claim 9, wherein the at least one interface includes an interface to electronic noses for measuring fragrances of perishable products being harvested.

13. The system of claim 12, wherein the electronic nose is mounted to a drone.

14. The system of claim 9, wherein the at least one hardware processor for comparing the harvest data measured with the TOT devices on the perishable items within the perishable item type to the consumer preferences for freshness from the consumer profile employs artificial intelligence for said matching the perishable items having freshness data to the consumer preferences from the consumer profile to provide the matched perishable items.

15. The system of claim 9, wherein said freshness data depicted on the display to the consumer for the matched perishable items includes a fragrance description measured from an electronic nose.

16. A computer readable storage medium comprising a computer readable program for the selection of perishable items using IOT devices, wherein the computer readable program when executed on a computer causes the computer to perform the steps of:
  registering a consumer to a system that assists with selection of perishable items using IOT devices based upon consumer preferences, in which the system collects data from a user in response to the consumer granting permission to the system, and wherein the consumer can revoke permission at any time;
  monitoring harvesting of a plurality of perishable item types using a plurality of internet of things (IOT) devices, wherein the IOT devices comprise cameras for taking optical images of perishable products being harvested;
  recording to the system freshness data that assists in the selection of perishable items from the perishable items within the perishable item types being monitored during said harvesting, the monitoring including images from the IOT devices indicative of freshness;
  recording a consumer profile on the system that assists in the selection of perishable items from the consumer including consumer preferences for freshness of perishable items according to a consumer preferred harvest cycle based on historical purchases of perishable items;
  selecting a perishable item type by the consumer through an online shopping portal that is linked to the system that assists the selection of perishable items using IOT devices based upon consumer preferences from the consumer preferred harvest cycle;

matching perishable items to the consumer preferences with the system that assists the selection of perishable items using IOT devices within the perishable item type having freshness data from monitoring the harvest to the consumer based upon consumer preferences from the consumer profile to provide matched perishable items to the consumer preferred harvest cycle, wherein the matching perishable items comprises an artificial neural network that matches the images and fragrance measurements from the IOT devices indicative of freshness to the consumer preferences for freshness of perishable items according to the consumer preferred harvest cycle based on the historical purchases of the perishable items having the corresponding images and the fragrance preferences; and transmitting a display of the matched perishable items to the consumer through the online shopping portal, in which the display depicts freshness data to the consumer for the perishable items, wherein the freshness data depicted on the display to the consumer for the matched perishable items includes a live video feed of the perishable items being harvested at a cultivation site and includes the images from the IOT devices that illustrate freshness.

17. The computer readable storage medium of claim 16, further comprising the consumer selecting perishable items from the display.

18. The computer readable storage medium of claim 16, wherein the IOT devices comprise cameras for taking optical images of perishable products being harvested.

* * * * *